US009243766B2

(12) United States Patent
Gerhard et al.

(10) Patent No.: US 9,243,766 B2
(45) Date of Patent: Jan. 26, 2016

(54) LIGHTING DEVICE FOR A VEHICLE

(75) Inventors: Markus Gerhard, Aachen (DE); Olaf Rottstadt, Fischbach (DE); Volker Heitbreder, Soest (DE)

(73) Assignee: Koninklijke Philips N.V., Eindhoven (NL)

( * ) Notice: Subject to any disclaimer, the term of this patent is extended or adjusted under 35 U.S.C. 154(b) by 1241 days.

(21) Appl. No.: 12/988,005

(22) PCT Filed: Apr. 16, 2009

(86) PCT No.: PCT/IB2009/051586

§ 371 (c)(1), (2), (4) Date: Oct. 15, 2010

(87) PCT Pub. No.: WO2009/130640

PCT Pub. Date: Oct. 29, 2009

(65) Prior Publication Data

US 2011/0032723 A1 Feb. 10, 2011

(30) Foreign Application Priority Data

Apr. 21, 2008 (DE) ........................ 10 2008 020 001

(51) Int. Cl.
*B60Q 1/04* (2006.01)
*F21S 8/10* (2006.01)
*F21V 25/00* (2006.01)

(52) U.S. Cl.
CPC ......... *F21S 48/1104* (2013.01); *F21S 48/1186* (2013.01); *F21S 48/1109* (2013.01); *F21V 25/00* (2013.01)

(58) Field of Classification Search
CPC .......................... F21S 48/1104; F21S 48/1186
USPC ................................. 362/475, 476, 487, 538
See application file for complete search history.

(56) References Cited

U.S. PATENT DOCUMENTS

| | | | | |
|---|---|---|---|---|
| 2,563,217 | A * | 8/1951 | Damron | 362/549 |
| 4,764,854 | A | 8/1988 | Matsune et al. | |
| 4,819,133 | A * | 4/1989 | Kochi et al. | 362/519 |
| 2004/0032746 | A1 | 2/2004 | Kakidaira et al. | |

FOREIGN PATENT DOCUMENTS

| | | |
|---|---|---|
| EP | 1 081 428 A2 | 3/2001 |
| FR | 773115 | 11/1934 |

* cited by examiner

*Primary Examiner* — David V Bruce

(57) ABSTRACT

A lighting device for a motor vehicle headlamp is described. The device includes a reflector for focusing light emitted by a light source. At the rear end of the reflector is an opening to receive at least a part of the light source, and a reflector neck that surrounds the opening and to which the light source is fastened in a defined position relative to a reflective surface of the reflector. A plurality of locking members are formed on the reflector which in the course of a rotary movement of the light source about the optical axis of the reflector or about an axis parallel thereto when the light source has been at least partly inserted in the reflector neck, engage in corresponding perforations formed in the fight source.

25 Claims, 7 Drawing Sheets

LIGHTING DEVICE FOR A VEHICLE

The present invention relates to a lighting device for a vehicle and in particular to a motor vehicle headlamp. The lighting device comprises a light source for emitting light and a reflector for focusing the light emitted by the light source. At the rear end of the reflector, there is formed an opening to receive at least one part of the light source and a reflector neck that surrounds the opening and to which the light source is fastened in a defined position relative to a reflective surface of the reflector. The invention also relates to a light source for a lighting device of this kind and to a reflector for a lighting device of this kind.

Different embodiments of a lighting device of this kind are known from the prior art. An incandescent lamp may be used as a light source but what is preferably used is a gas discharge lamp. The light source is fastened to the neck of the reflector in such a way that a glass envelope that is inserted into the interior of the reflector through the opening at the rear end of the reflector and that holds the incandescent coil or the arc is positioned in a defined position relative to the reflective surface on the inside of the reflector. This is necessary to enable the headlamp always to produce light that is distributed in the same way.

If the light source takes the form of a gas discharge lamp, it also comprises an igniter for igniting and maintaining the arc, the igniter forming an integral part of the lamp base at an end opposite from the glass envelope. The igniter usually has a housing made of a conductive material. A light source of this kind is known from the prior art by the name of, for example, a D1, $D1^{+}$ or D3 lamp. When a light source of this kind is in use, what are important are not only the mechanical fastening of the light source to the reflector but also the making of electrically conductive contact between the housing of the igniter and the reflector, which in this case is likewise composed of an electrically conductive material or at least is coated with such a material. The aim is for the effects of the electromagnetic radiation generated by the gas discharge lamp (caused in particular by the igniting of the arc at high voltages) to be reduced by the electrically conductive connection between the housing of the igniter and the reflector (for improved EMC=electromagnetic compatibility). In motor vehicle headlamps, the electromagnetic radiation from the gas discharge lamp needs to be screened off as well as possible from a vehicle's other electronic systems.

Known from the prior art are many different ways of fastening D1 lamps to reflectors in which the lamp is pressed by its base into a tapering lamp receptacle at the neck or lamp seating of the reflector and is held therein and/or is fastened thereto.

In a first possible solution that is known from the prior art, there is arranged at the rear end of the reflector a lamp fastening arrangement in which the lamp is fastened in place by its base by means of a one-piece ring that can be rotated. There is no rotary movement of the lamp itself when this is done. Instead, the lamp is inserted into the reflector from the rear end thereof in the axial direction, substantially parallel to the optical axis of the reflector, and is fastened thereto by means of a rotary movement of the ring. Screening for EMC purposes is accomplished by means of a plurality of small contact tabs on an additional part made of sheet metal. Laterally, the extra space that is required for fastening the D1 lamp in place in this way is approximately 30 mm to enable the rotatable ring to be gripped and actuated. It is not possible in practice to change a lamp when the headlamp is installed in a vehicle because the lamp has to be held in the fastening arrangement and the ring has to be turned at the same time.

In a further possible solution that is known from the prior art, the lamp is fastened to the rear end of the reflector by means of a bow spring made of wire. There is no rotary movement of the lamp itself when this is done. Screening for EMC purposes is accomplished by means of a reflector neck, having a wire spring built into it, that takes the form of a frame of die-cast aluminum and surrounds the lamp to a very large extent. The extra space that is needed around the D1 lamp with this solution is approximately 10 mm at the sides (when the bow spring made of wire is closed) and to the rear end of the lamp it is approximately 15 mm (to allow the bow spring to be opened). The die cast frame is fastened to the reflector by three screws. The solution as a whole is high in weight and all in all consists of seven separate components. It is not possible in practice to change a lamp with only one hand when the headlamp is installed in a vehicle because the lamp has to be held in the fastening arrangement and has to be secured in place with the bow spring at the same time.

In yet another possible solution that is known from the prior art, the lamp is fastened to the reflector by means of a separate fastening plate. There is no rotary movement of the lamp itself when this is done. Nothing is done to ensure screening for EMC purposes. In this known version, the D1 lamp is inserted into a U-shaped cutout in a loose fastening plate and is fastened to the reflector with two screws. Laterally, the extra space around the D1 lamp that is required for this purpose is approximately 12 mm. It is true that the solution as a whole is low in weight and consists of only three separate components. However, a lamp change is only possible with a tool and carried be carried out in practice, or at least not with only one hand, when the headlamp is installed in a vehicle.

In a final solution that is known from the prior art, the light source is fastened to the rear end of the reflector by means of a rotatable two-piece ring of plastics material. In this case, two half-shells made of plastics material that are separate from the reflector are first fastened to the lamp base by positive inter-engagement and form a ring made of plastics material. The D1 lamp is then fastened to the reflector by a bayonet-type joint by turning the ring of plastics material. Screening for EMC purposes is accomplished by means of contact tabs situated in the retaining ring. Laterally, the extra space around the D1 lamp that is required for fastening of this kind is approximately 5 to 7 mm. The solution as a whole is relatively low in weight and consists of only four separate components. It is impossible in practice for a complete lamp change to be made in the vehicle with only one hand because the half-shells making up the ring of plastics material first have to be removed from the faulty lamp and attached to the base of the new lamp. Only then can the lamp be inserted in the reflector neck and fastened to it by means of the retaining ring. A further problem is posed by the half-shells making up the ring, which may get lost when a lamp is being changed because they have to be taken out of the reflector to allow the lamp to be changed. Finally, it is also a disadvantage that the lamp is accurately positioned only in the axial direction; positioning in the radial direction is not particularly accurate.

To sum up, what is thus known from the prior art is not a single arrangement for fastening a light source, and preferably a gas discharge lamp such for example as what is referred to as a D1, a $D1^{+}$ or a D3 lamp, in place in a motor vehicle headlamp by which the light source can be fastened directly to a reflector without the need for any additional fastening parts and that ensures high thermal stability and high dynamic strength. At the same time, the fastening arrangement should be quick, easy and cost-saving to produce, should be low in weight, should allow a lamp to be changed quickly and easily with only one hand and should, in addition, enable screening for EMC purposes to be accomplished.

The object underlying the present invention is thus to design and refine a lighting device of the kind specified in the opening paragraph in such a way that the light source can be fastened directly to a reflector neck at the rear end of a reflector in a predefined position relative to the reflective surface of the reflector without the need for additional, separate components for guiding and/or fastening the light source on or to the reflector, which lighting device makes it possible for the light source to be fastened to the reflector easily, securely and quickly with only one hand.

To allow this object to be achieved, it is proposed, taking as a basis the lighting device of the kind specified in the opening paragraph, that a plurality of locking members be formed on the reflector, which locking members, in the course of a rotary movement of the light source about the optical axis of the reflector or about an axis parallel thereto when the light source has been at least partly inserted in the reflector neck in the direction of the optical axis, engage in corresponding perforations formed in the light source, at least one of the locking members co-operating with at least one of the perforations in the course of the rotary movement in such a way, and causing forced guidance of the light source in such a way, that the light source is held in a defined position in the axial direction relative to the reflector.

The locking members are formed on the reflector neck, and preferably on the rear end of the reflector, i.e. the outside of the reflector. Corresponding perforations to receive the locking members are formed in the light source, and preferably in the lamp base. It has been realized in accordance with the invention that the fastening of a lamp, and preferably a gas discharge lamp, to the reflector can be simplified by forming suitable fastening means, in the form of the locking members and the perforations, directly on the reflector and in the lamp base respectively. The fastening of the lamp to the reflector thus takes place without the need for any additional fastening means separate from the reflector and the lamp.

In accordance with the invention, it is proposed that the lamp be inserted in the reflector in the axial direction, i.e. substantially parallel to the optical axis of the reflector. When this is done, the locking members enter the corresponding perforations in the lamp base. During a rotary movement, which follows, of the lamp about the optical axis of the reflector or about an axis parallel thereto the locking members or parts thereof come into engagement with the perforations. The arrangement and configuration of the locking members and the perforations are matched to one another in such a way that the positioning of the lamp in the axial direction, and preferably in the radial direction too, takes place as a result of the rotary movement of the lamp. In addition, the lamp may be fixed to the reflector in the accurately defined position at the end of the rotary movement to prevent the lamp from unintentionally becoming detached from the reflector, due for example to vibrations in the vehicle.

In an advantageous embodiment of the present invention, it is proposed that the perforations be formed in that part of the light source that is received by the reflector neck. This part is preferably a lamp base. It is also proposed that the locking members be formed directly on the reflector neck. By this means, the light source can be fastened directly to the rear end of the reflector, i.e. the outside of the reflector, without the need for separate fastening members. The locking members that are formed directly on the reflector neck may be formed directly on the end wall of the reflector neck, i.e. on the outside of the reflector, or on the rear end of the reflector. It is however also conceivable, if the lamp base and the perforations formed therein are of a suitable configuration, for them to be formed on the wall of the reflector neck and preferably on the inside of the wall.

In a preferred embodiment, the locking members that cause the forced guidance of the light source each have a nose that extends in the circumferential direction in the opposite direction to the rotary movement, and that engages in the course of the rotary movement in an undercut associated with a given one of the perforations. The outline of the perforations when seen in the direction defined by the optical axis substantially corresponds to the outline of the locking members, which is determined by the outline of the noses. The perforations may extend entirely through the thickness of the lamp base so that, when the light source is locked to the reflector, the noses of the locking members extend on the side of the lamp base that is remote from the rear end of the reflector. The region at the rear end of the reflector between the lamp base and the igniter then forms, in a sense, an undercut within the meaning of the present embodiment. This design is particularly suitable for solid lamp bases, made for example of plastics material. In the case of solid lamp bases, it is however also conceivable for the perforations to extend for only part of the thickness of the lamp base and for the undercuts in which the noses of the locking members engage then to be formed in the inside of the base, next to the perforations.

Alternatively, the lamp base may also be of a hollow form, by means for example of two dished metal plates that touch and are fastened to one another at their edges, thus forming a hollow space between the two plates. In this case the perforations are formed only in the plate that faces towards the outside of the reflector, the undercuts being formed by the hollow space between the plates. In a gas discharge lamp the metal lamp base may be in electrically conductive contact with the housing of the igniter, thus enabling screening for EMC purposes to be achieved that is improved over electrically conductive contact between the base and the reflector.

In another preferred embodiment, there are formed on the reflector neck a plurality of axially acting supporting elements that are arranged to be distributed around the opening in the reflector and that each have a contact-making surface that faces towards the rear in the direction of the optical axis of the reflector and on which that part of the light source that is received by the reflector neck, such as the lamp base for example, is supported when the lamp is in the state where it is fitted to the reflector. The reflector neck preferably has three supporting elements that are arranged around the opening, preferably at equal angular distances from one another. The lamp base is thus held between the noses of the locking members and the contact-making surfaces of the supporting elements by a clamping action.

The contact-making surfaces of the supporting elements advantageously follow an inclined path, the inclines of the contact-making surfaces being so aligned that the distance between that part of the light source that is received by the reflector neck at the rear end of the reflector increases during the rotary movement of the light source, over at least part of the angular range covered by the rotary movement, as the angle of rotation increases. By this means, the lamp base is pressed harder against the noses of the locking members as the angle of rotation increases. Hence, the lamp base is increasingly firmly clamped as the angle of rotation increases.

The lamp is first inserted in the reflector neck in the axial direction, i.e. substantially parallel to the optical axis. Certain regions of the lamp base then rest against the contact-making surfaces at the beginnings of the inclines. At the same time, the noses of the locking members enter the perforations in the lamp base. In the course of the rotary movement that then follows, the noses fit behind the undercuts in the lamp base and at the same time the lamp base slides up the inclined contact-making surfaces of the supporting elements on the reflector. As this takes place, the distance between the lamp base and the outside of the reflector becomes larger. Finally, the lamp base is moved to its defined axial end position relative to the reflector and is fixed there by, for example, frictional engagement.

In a further preferred embodiment, there are formed, on that part of the light source that is received by the reflector neck, supported points that project from the surface of the received part and that face towards the contact-making surfaces of the supporting elements of the reflector during at least part of the rotary movement. The supported points that project from the surface of the received part of the light source make it possible for the lamp to be very accurately positioned relative to the reflector in the axial direction. Also, the point support that the lamp base has on the reflector reduces friction during the rotary movement.

In the context of this advantageous embodiment, the contact-making surfaces of the supporting elements of the reflector co-operate with those regions of the lamp base belonging to the light-source that rest on them in such a way that, on the base being received by the reflector neck, the rotary movement of the light source is first compelled to include a movement parallel to the optical axis and away from the reflector.

During the rotary movement, the lamp base is slid under the noses of the locking members, in the course of which it travels over the inclines of the contact-making faces of the supporting elements. Towards the end of the rotary movement and at the ends of the inclines, the lamp base is clamped between the noses of the locking members and the supporting surfaces in the axial direction. When this happens the lamp base may latch into an end position, as will be described in detail below.

In another advantageous embodiment of the invention, the contact-making surfaces of the supporting elements of the reflector each have a latching depression to receive, towards the end of the rotary movement, an outwardly curved portion of a corresponding supported point on that part of the light source that is received by the reflector neck. The latching depressions are thus formed in an end portion at the top of the inclines of the contact-making surfaces, and preferably in a substantially horizontal portion that follows on from the inclines in the direction of rotation of the light source. The outline or shape of the latching depressions may be matched to the outline or shape of the projections from the supporting surface of the lamp base, that are formed by the supported points. Where for example the projections are in the form of segments of a sphere, it is conceivable for the latching depression to be a crater-like one of a similar configuration. Fixing in place of the light source on the reflector in the radial direction too may possibly be achieved by this means. However, the latching depressions preferably take the form of latching grooves whose longitudinal extent preferably lies at right angles to the direction of the rotary movement. The light source is secured in place on the reflector in the circumferential direction (i.e. in the direction of rotation and the opposite direction) by this means.

The reflector neck may be formed as a separate component and may be fastened around the opening at the rear end (outside) of the reflector. This has the advantage that, if the rear end of the reflector and/or the region at which the reflector neck is supported on the rear end of the reflector is of a suitable configuration, different reflectors can be equipped with the same reflector neck. Also, existing reflectors may be retrofitted with the reflector neck to enable fastening of the light source to the reflector to be accomplished in the manner according to the invention in the case of these reflectors too. Preferably however, the reflector neck takes the form of an integral component of the reflector at the rear end thereof, surrounding an opening for the lamp.

As a further way of achieving the object of the present invention, it is proposed, taking as a basis the light source of the kind specified in the opening paragraph, that the light source have at least one perforation to receive at least one corresponding formed locking member on the reflector neck, at least one of the perforations being so matched in arrangement and/or configuration to the arrangement and/or configuration of at least one of the locking members that, on being received in the reflector neck, the light source is forcibly guided, during a rotary movement of the said light source that follows about the optical axis of the reflector or about an axis parallel thereto, in such a way that the light source is held in a defined position in the axial direction relative to the reflector.

Preferred embodiments of the light source according to the invention can be seen from the dependent claims.

Finally, taking the reflector of the kind specified in the opening paragraph as a basis, it is proposed as yet another way of achieving the object of the invention that a plurality of locking members be formed on the reflector to engage in perforations formed in that part of the light source that is received by the reflector neck, at least one of the locking members being so matched in arrangement and/or configuration to the arrangement and/or configuration of at least one corresponding perforation that, on being received in the reflector neck, the light source is forcibly guided, during a rotary movement of the said light source that follows about the optical axis of the reflector or about an axis parallel thereto, in such a way that the light source is held in a defined position in the axial direction relative to the reflector.

A preferred embodiment of the invention will be explained in detail below by reference to the drawings. In the drawings.

Figure 2:
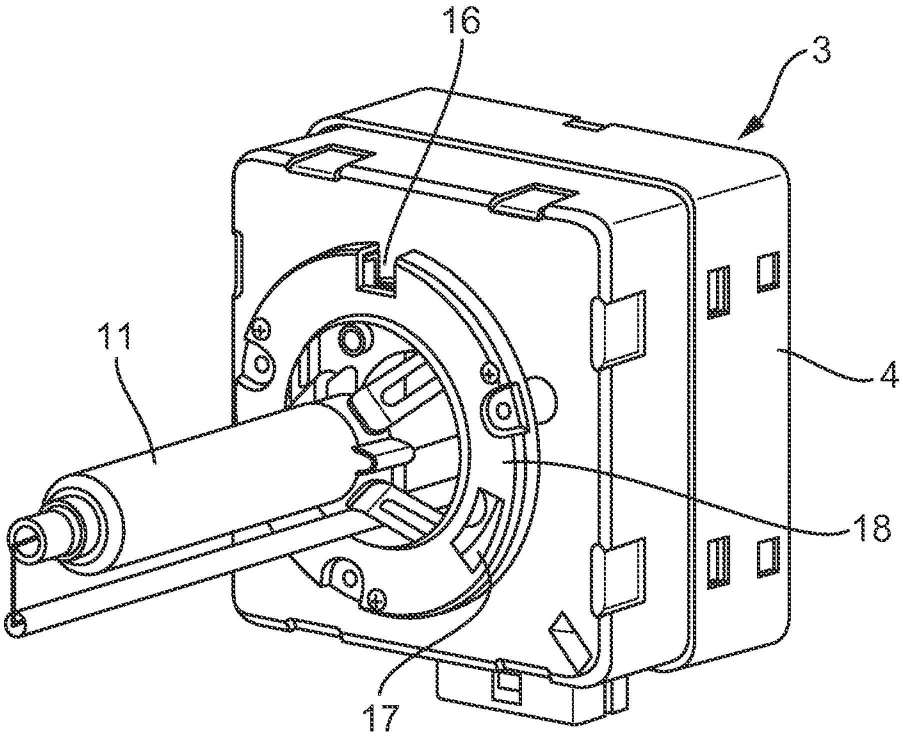
FIG. 2 is a perspective view of a preferred embodiment of light source according to the invention.
Figure 3A:
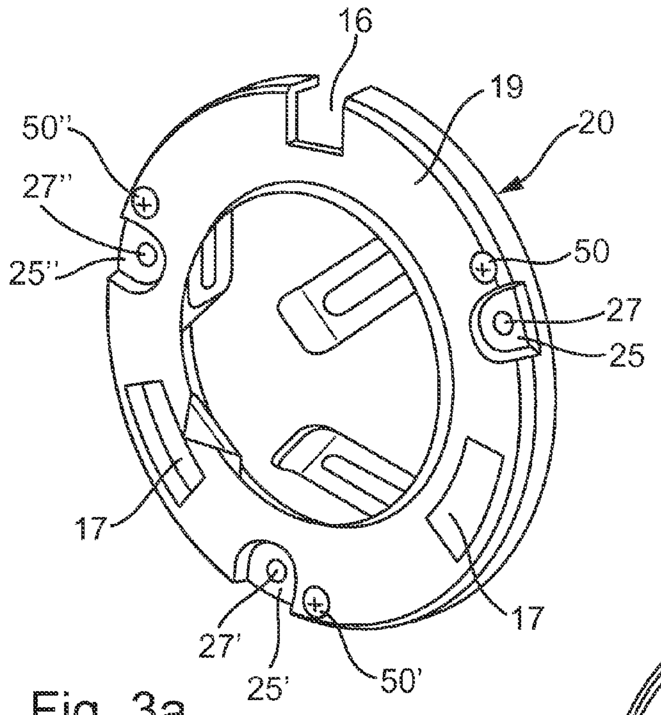

FIG. 3*a* is a perspective view of a first component of a lamp base of the light source according to the invention that is shown in FIG. 2.

Figure 3B:
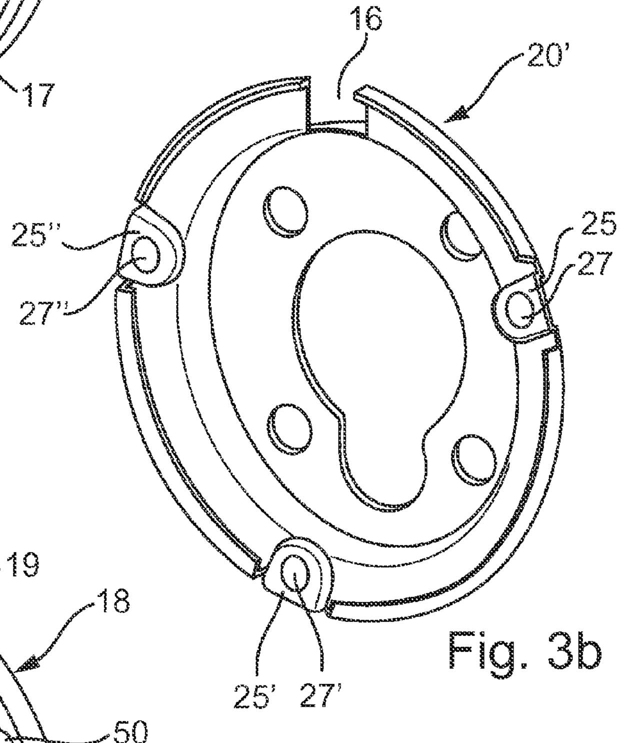

FIG. 3*b* is a perspective view of a second component of the lamp base of the light source according to the invention that is shown in FIG. 2.

Figure 3C:
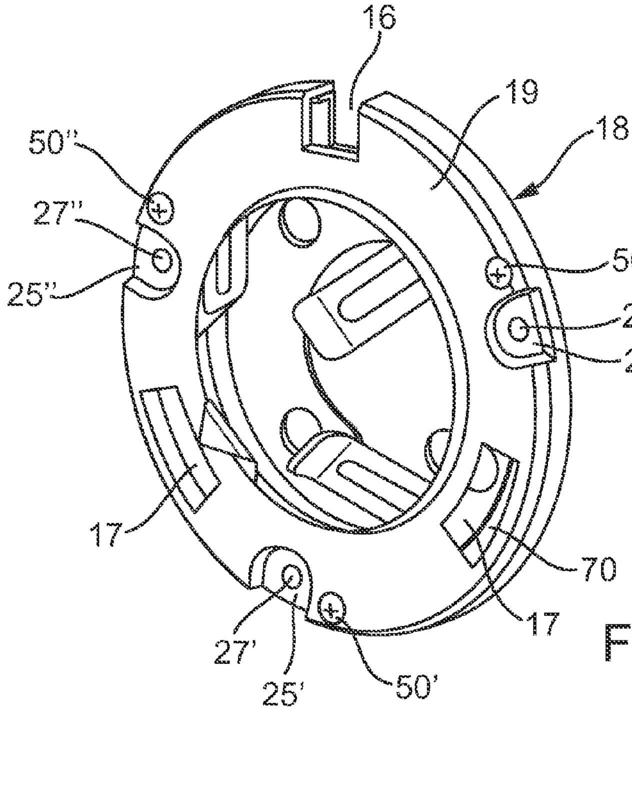

FIG. 3*c* is a perspective view of the complete lamp base that has the components that are shown in FIGS. 3*a* and 3*b*.

Figure 4A:
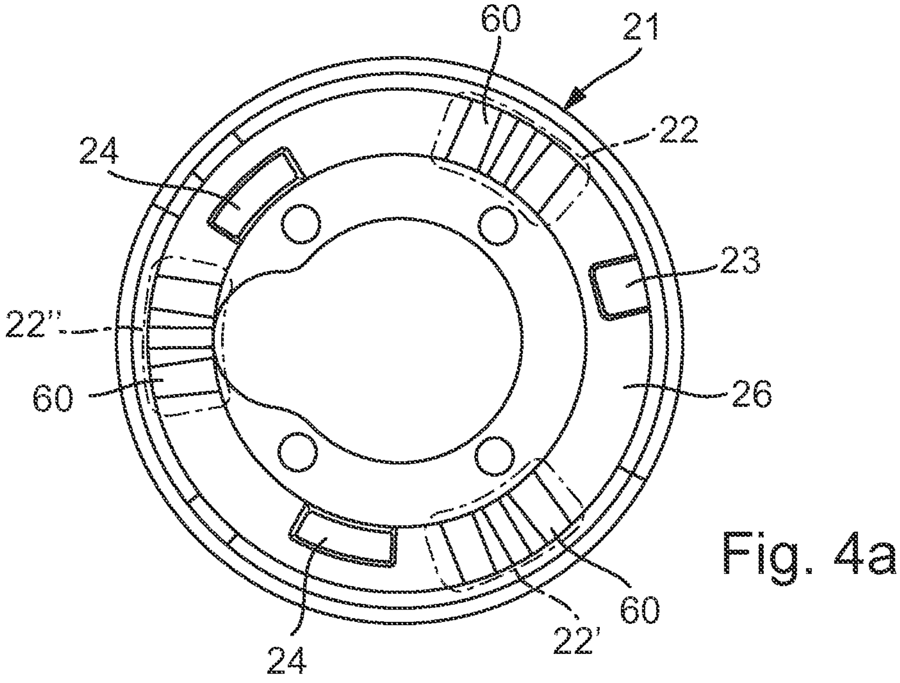

FIG. 4*a* is a plan view of a neck of a preferred embodiment of reflector according to the invention.

Figure 4B:
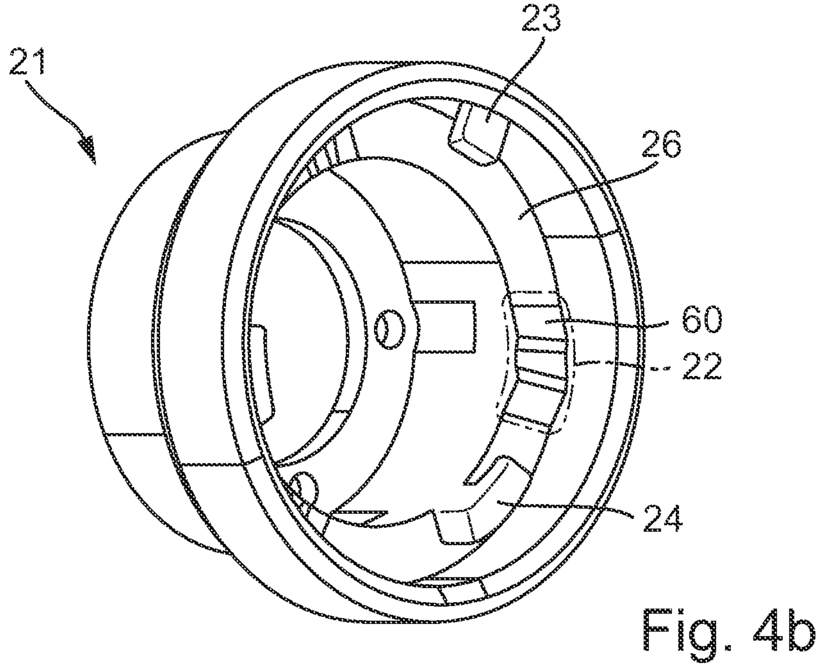

FIG. 4*b* is a perspective view of the reflector neck shown in FIG. 4*a*.

Figure 5A:
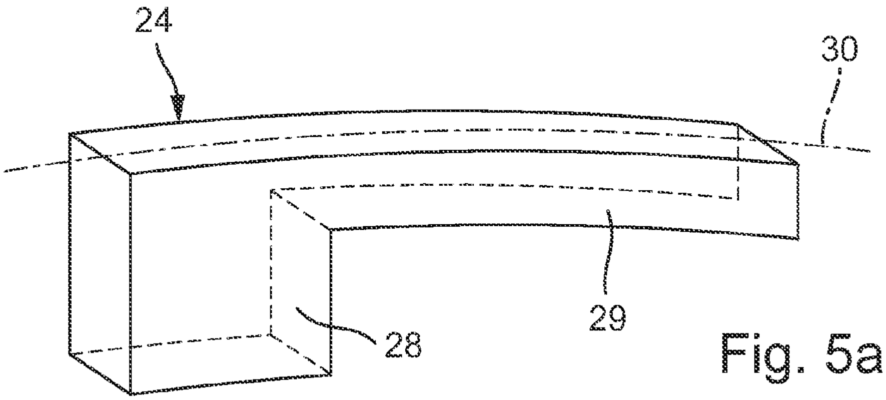

FIG. 5*a* is a perspective view of a locking member having a rectangular base portion.

Figure 5B:
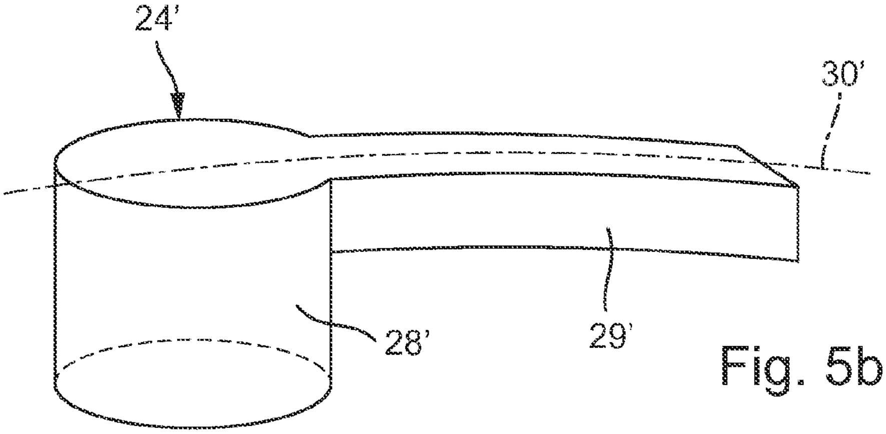

FIG. 5*b* is a perspective view of a locking member having a circular base portion.

Figure 6:
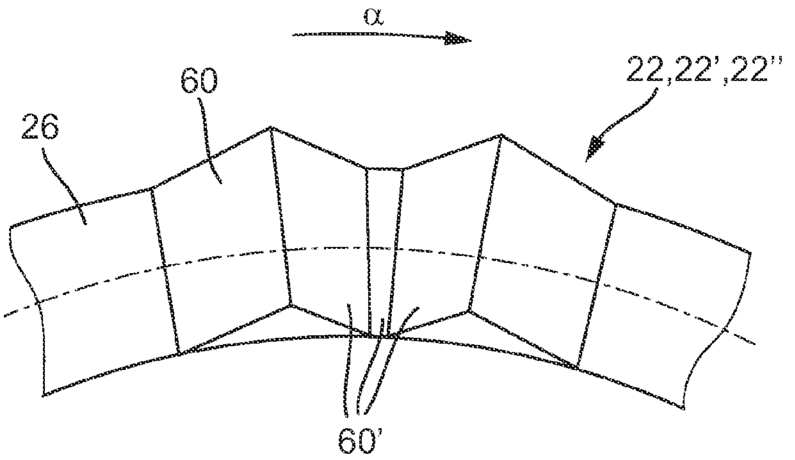

FIG. 6 is an enlarged perspective view of one of the supporting elements in the reflector neck or at the supporting shoulder shown in FIGS. 4*a* and 4*b*.

Figure 7A:
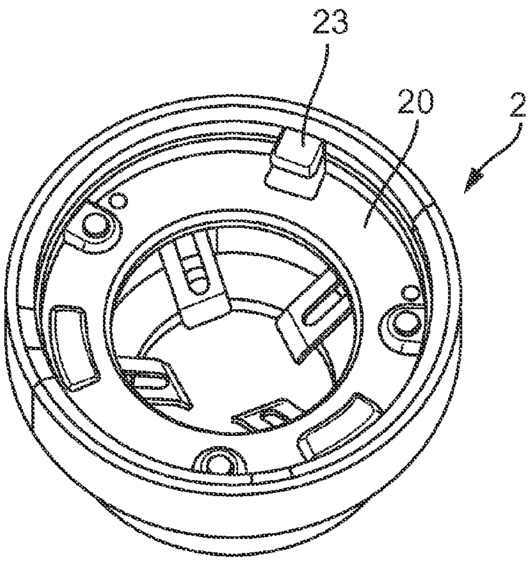

FIG. 7*a* is a perspective view of the reflector neck shown in FIGS. 4*a* and 4*b*, and of the first component of the lamp base shown in FIG. 3*a* when it has been received therein and is in an inserted position.

Figure 7B:
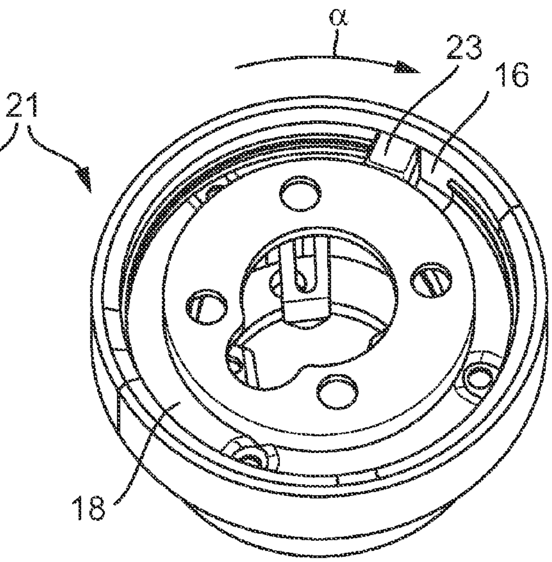

FIG. 7*b* is a perspective view of the reflector neck shown in FIGS. 4*a* and 4*b*, and of the complete lamp base shown in FIG. 3*c* when it has been received therein and is in an end position.

Figure 7C:
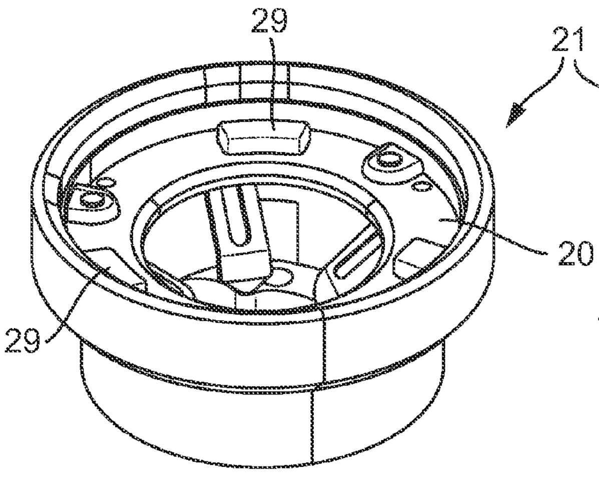

FIG. 7*c* is a perspective view of the reflector neck shown in FIGS. 4*a* and 4*b*, and of the first component of the lamp base shown in FIG. 3*a* when it has been received therein and is in the inserted position shown in FIG. 7*a*.

Figure 7D:
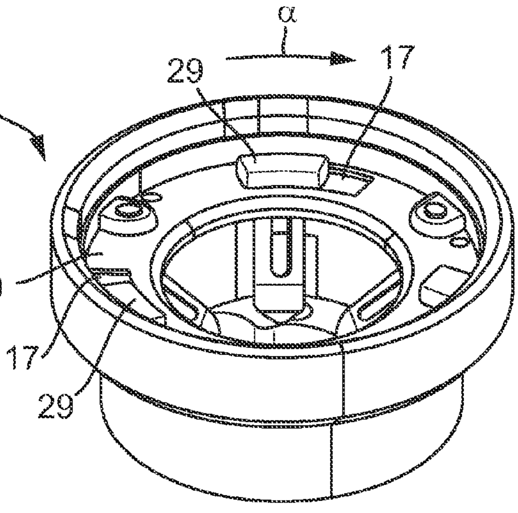

FIG. 7*d* is a perspective view of the reflector neck shown in FIGS. 4*a* and 4*b*, and of the first component of the lamp base shown in FIG. 3*a* when it has been received therein and is in the end position shown in FIG. 7*b*.

Figure 8A:
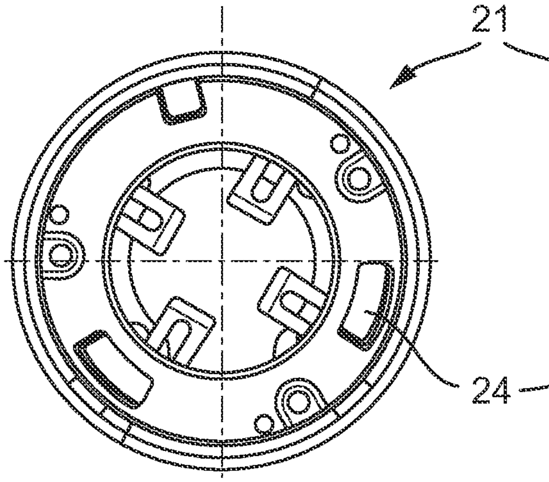

FIG. 8*a* is a plan view of the reflector neck shown in FIGS. 4*a* and 4*b*, and of the first component of the lamp base shown in FIG. 3*a* when it has been received therein and is in the inserted position shown in FIG. 7*a*.

Figure 8B:
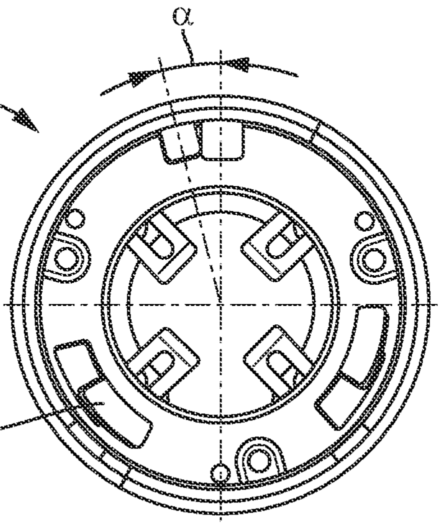

FIG. 8*b* is a plan view of the reflector neck shown in FIGS. 4*a* and 4*b*, and of first component of the lamp base shown in FIG. 3*a* when it has been received therein and is in the end position shown in FIG. 7*b*.

Figure 8C:
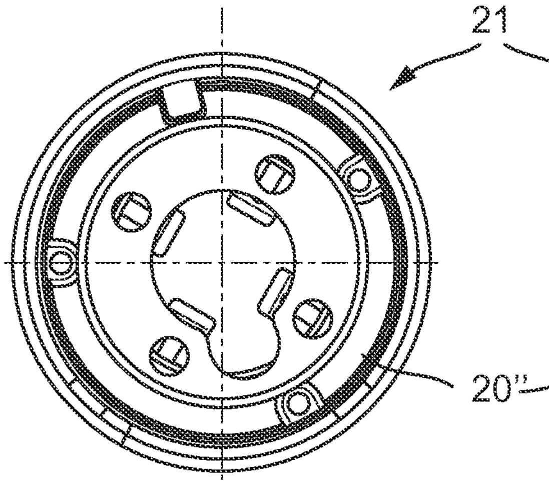

FIG. 8*c* is a plan view of the reflector neck shown in FIGS. 4*a* and 4*b*, and of the second component of the lamp base shown in FIG. 3*b* when it has been received therein and is in the inserted position shown in FIG. 8*a*.

Figure 8D:
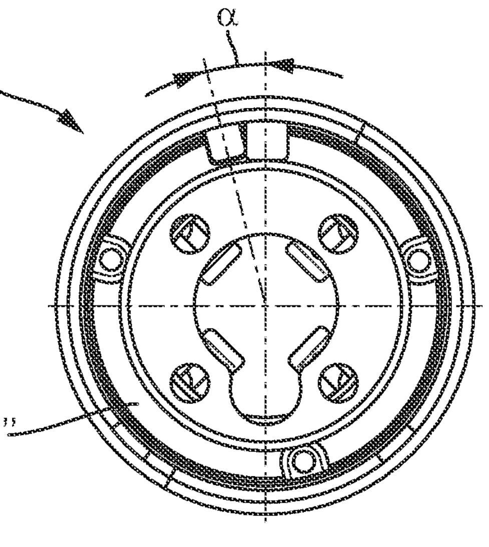

FIG. 8*d* is a plan view of the reflector neck shown in FIGS. 4*a* and 4*b*, and of the second component of the lamp base shown in FIG. 3*b* when it has been received therein and is in the inserted position shown in FIG. 8*b*.

Figure 1:
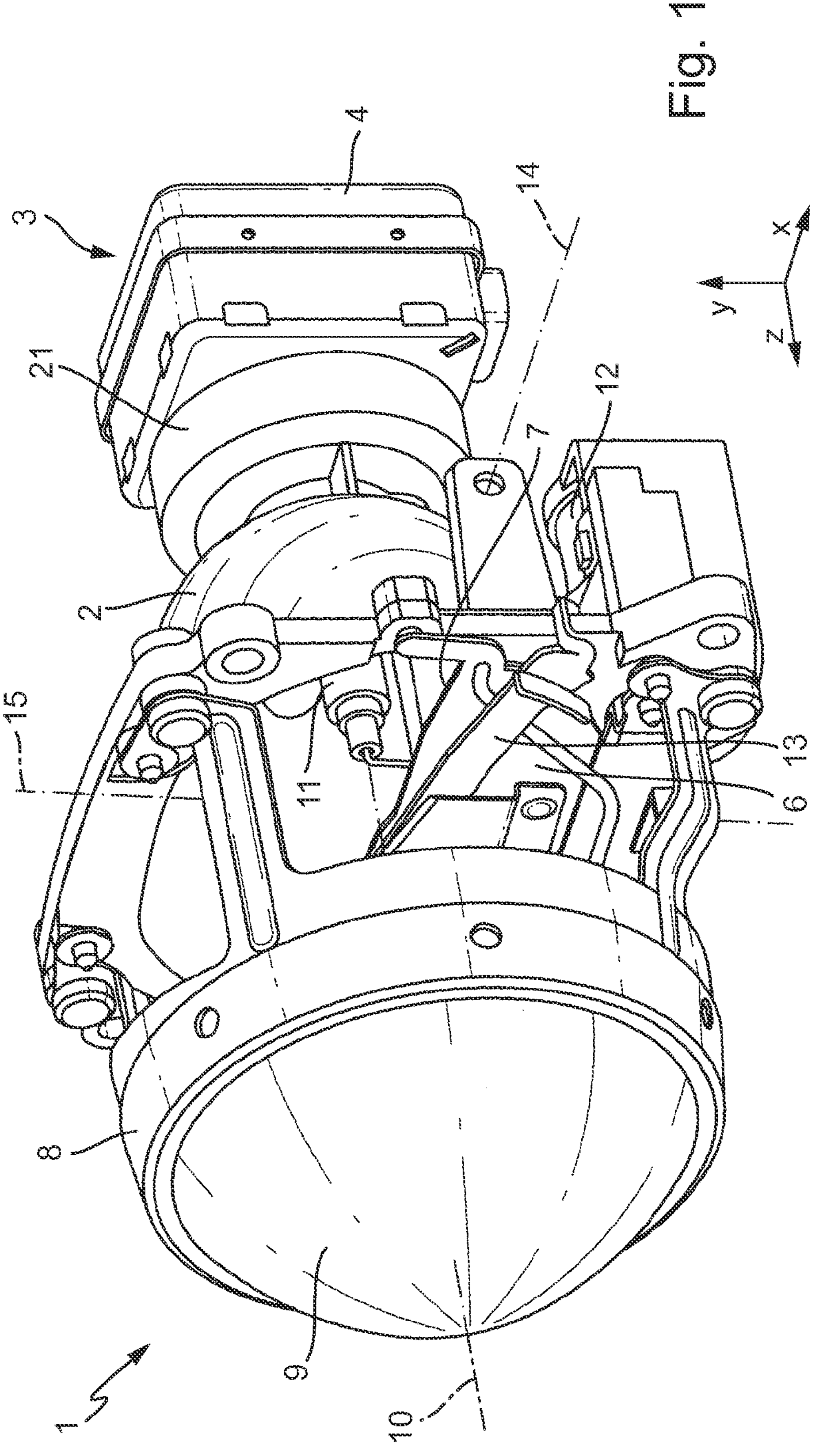
FIG. 1 is a three-quarter perspective view from the front of a lighting module of a preferred embodiment of lighting device according to the invention.

In FIG. 1, a lighting module of a motor vehicle headlamp according to the invention is identified as a whole by reference numeral 1. The lighting module 1 is in the form of what is referred to as a polyellipsoidal system (PES) module or projector module. The PES module 1 comprises a reflector 2 that is made of plastics material or metal and preferably of die cast metal. When the reflector 2 is made of plastics material, a reflective coating is applied to the inside of the reflector 2, at least in the region of the reflecting surface. The reflector 2 is preferably ellipsoidal in shape or is of a free form that differs from the ellipsoidal. The lighting module 1 also comprises a lamp 3 that takes the form, in the embodiment shown, of a gas discharge lamp, and in particular that of what is referred to as a D1 lamp. Forming an integral part of the gas discharge lamp 3 is an igniter 4 that is used to ignite and maintain an arc in a glass envelope 11 belonging to the lamp 3. The igniter 4 is, in particular, fastened to the glass envelope 11 and a base 18 (see FIG. 2) of the lamp 3 in such a way as to be solid in rotation therewith. The arc that is generated in the glass envelope 11 of the light source 3 is preferably arranged in the region of a first focal point of the reflector 2 of an ellipsoidal or ellipsoid-like form. The lamp 3 is fastened to the rear end of the reflector 2 by inserting the lamp base 18, in translation, into a reflector neck 21 in parallel with the optical axis 10, and by then turning the light source 3 complete with the base 18 about the optical axis 10.

An exit opening for light at the front of the reflector 2 is partly blanked off by a light shield 6. The light shield 6 comprises a top edge 7 that follows an asymmetrical path, i.e. a region of the top edge 7 that is situated on one side of a vertical center plane extending through the optical axis 10 of the reflector 2 is higher or lower, depending on the direction in which the comparison is made, than the region of the top edge situated on the other side of the center plane. The transition between the higher and lower portions of the asymmetrical top edge 7 may be implemented in the form of a 15° gradient, a 45° gradient or a step. Arranged at the front of the reflector 2 are fastening means 8 that hold a projector lens 9 in a defined position relative to the reflector 2. The top edge 7 of the light shield 6 is projected onto the road ahead of the motor vehicle by the projector lens 9 as an asymmetrical light-dark cut-off. What is meant by "asymmetrical" is that the range over which light is distributed on the vehicle's own side of the road (on the right-hand side of the road in right-hand traffic) is longer than on the side on which oncoming traffic is situated (on the left-hand side of the road in right-hand traffic). This is intended to prevent oncoming road users from being dazzled. The asymmetrical path followed by the light/dark cut-off in the light distribution arises from, depending on the configuration of the top edge 7 of the light shield 6, a 15° rising gradient, a 45° rising gradient or a step. The top edge 7 of the light shield 6 is preferably arranged in the region of the second focal point of the reflector 2.

The light shield 6 may be designed to be movable to vary the light distribution. It is for example conceivable for the entire light shield 6 to fold up and down about an axis of tilt that extends substantially horizontally at right angles to the optical axis 10 of the reflector 2. It would also be conceivable for the light shield 6 to have a static element and at least one element that was movable relative to the static element, with the movable element of the light shield being movable about a horizontal axis of rotation extending substantially parallel to the optical axis 10. The optically active top edge 7 of the light shield 6 would be formed by a superimposition of the top edges of the individual light-shield elements. The path followed by the top edge 7 could be varied by moving the light-shield elements relative to one another. The top edge 7 of the light shield 6 is raised or lowered by, in the respective cases, folding the entire light shield 6 up or down and moving the movable light-shield element. By moving the light shield 6 or the movable light-shield element, the distribution of the light emerging from the headlamp or lighting module 1, and in particular the light/dark cut-off, can be raised and lowered. In the simplest case (folding of the light shield 6 up or down about an axis of tilt extending at right angles to the optical axis), a changeover is made between low-beam and high-beam light. In a more sophisticated case (movement of the movable light-shield element or elements about an axis of rotation extending parallel to the optical axis), an adaptive distribution of light is achieved, to produce for example lighting for highways, lighting for country roads, lighting for towns, bad-weather lighting, etc. A positioning unit 12 is provided for moving the light shield 6 or the light-shield elements, and this may take the form of an electric motor, and preferably a stepping motor, or a solenoid. The light shield 6 may, in addition, have a further element 13 that is movable about a horizontal axis of pivot extending substantially parallel to the optical axis 10 of the reflector 2 and that serves to switch the light distribution between right-hand traffic and left-hand traffic.

The lighting module 1 is arranged in a headlamp shell (not shown in FIG. 1) either on its own or together with other lighting modules, which may likewise take the form of PES modules or reflector modules. To implement headlamp leveling, the entire lighting module 1 may be designed to be pivotable about a horizontal axis of pivot (14) extending substantially at right angles to the optical axis 10 of the reflector 2. To enable a dynamic bend lighting function to be implemented, the lighting module 1 may also be mounted to be rotatable in the headlamp shell about an axis of rotation 15 that extends substantially vertically and at right angles to the optical axis 10 of the reflector 2. The leveling function, the bend lighting function and the adaptive distribution of light that are achieved by moving the light shield 6 or the elements of the light shield will not be looked at in detail here. Instead, what will be explained in detail below is the fastening of the lamp 3 to the rear end of the reflector 2 in a defined position.

FIG. 2 shows a gas discharge lamp 3 according to the invention having a lamp base 18 of special design. The lamp comprises an igniter 4, a glass envelope 11 and the lamp base 18. The lamp base 18 is provided with a cut-out 16 at the circumference. The cut-out 16 serves as part of a coding arrangement that only permits the lamp 3 to be inserted parallel to the optical axis 10 when it is in a defined position in rotation about the optical axis 10. The lamp base 18 also has perforations 17 to receive corresponding locking members 24 (see FIGS. 4*a* and 4*b*) on the reflector 2. The shape and dimensions of the lamp base 18 are so designed that it can be inserted in the reflector neck 21 parallel to the optical axis 10 and can be rotated therein about the optical axis 10. In the embodiment that is described here and that is shown in the drawings, the lamp base 18 is circular in outline in a plane extending perpendicularly to the optical axis 10.

FIGS. 3*a*, 3*b* and 3*c* show various components from which the lamp base 18 is assembled. It can be seen from FIG. 3*c* that the lamp base 18 comprises two separate components, namely a first component 20 (see FIG. 3*a*) and a second component 20' (see FIG. 3*b*). Both the components 20 and 20' are preferably produced as sheet-metal parts. The lamp base 18 may of course also be composed of other materials such for example as of plastics material.

The two components 20 and 20' of the lamp base 18 preferably take the form of pieces of sheet metal that have been formed substantially into a dished shape. The first component 20 is a supported part that is adjacent the reflector 2 and the second component 20' is remote from the reflector 2, i.e. is adjacent the igniter 4. The dished components 20, 20' are fitted into one another at their openings and they thus touch around their edges and define a hollow space 70.

Stamped into both components 20, 20' are depressions 25 to 25" that are provided with holes 27 to 27" for rivets. After being blanked out and brought to the desired shape, the two components 20, 20' are riveted together.

In their circumferential edges, both the components 20, 20' have a rectangular cut-out 16, the individual cut-outs 16 in the components 20, 20' that are assembled to form the lamp base 18 lining up with one another and forming a coding opening. The first component 20 has, in addition, two perforations 17 extending in the circumferential direction that allow access to the hollow space 70. The perforations 17 serve to receive locking members (24) that are formed on the reflector neck 21.

At that end-face of the lamp base 18 that is directed forward (in the positive z direction) (see FIG. 3*a*), there are formed on the first component 20 a plurality of, and preferably three, supported points 50 to 50" that project from the end-face 19 of the base 18, which supported points 50 to 50" mark out a positioning plane that is formed substantially at right angles to the optical axis 10 and in which the lamp 3 is positioned relative to the reflector 2 in the axial direction.

FIGS. 4*a* and 4*b* show the reflector neck 21 in detail. The locking members 24 are formed on an annular supporting shoulder 26 that extends in the radial direction in the reflector neck (21) at a distance from the rear end of the reflector 2. They are shown in detail in FIGS. 5*a* and 5*b*. Alternatively, they may also be formed on the end-wall of the reflector neck 21 (i.e. on the outside of the reflector 2) or at some other point on the reflector neck 21. A coding projection 23 that extends radially inwards from the inner wall of the reflector neck 21 and that enters the coding opening 16 when the lamp 3 is inserted parallel to the optical axis 10 is formed at an upper edge of the reflector neck 21. Because of the coding means 16, 23, the lamp 3 can be inserted in the reflector neck 21 in translation, parallel to the optical axis 10, only when it is in a defined angular position about the optical axis 10. Apart from the locking members 24, what are also formed on the supporting shoulder 26 are supporting elements 22 to 22" that form a contact-making surface for the supported points 50 to 50" on the lamp base 18.

FIGS. 5*a* and 5*b* show, by way of example, respective variants of the locking member 24 that is formed on the reflector neck 21 or on the supporting shoulder 26, as the case may be. The respective locking members 24 (see FIG. 5*a*) and 24' (see FIG. 5*b*) comprise respective base portions 28, 28', and respective noses 29, 29' that start from the latter and extend at a distance from the surface of the rear end of the reflector or of the supporting shoulder 26, as the case may be. Once the light source 3 has been inserted in the reflector neck 21, the noses 29, 29' engage, when the light source 3 is turned about the optical axis 10, in the undercuts that are formed in the region of the perforations 17 in the lamp base 18. In the case of a lamp base 18 that is formed as shown in FIG. 3*c*, a portion of the first component 20, which portion borders on the perforation 17, is thus arranged between the nose 29, 29' and the surface of the rear end of the reflector or of the supporting shoulder 26, as the case may be, after the rotary movement of the light source 3.

FIG. 5*a* shows a first embodiment of locking member 24 that has a base 28 that occupies a substantially rectangular area in cross-section. The locking member 24 is arranged at the crest of the reflector, circumferentially around the opening to receive the glass envelope 11 of the light source 3. The longitudinal extent of the locking member 24 along a longitudinal axis 30 is preferably curved about an imaginary center of the opening in the reflector 2, with at least the curvature of the base 28 of the locking member 24 corresponding to the curvature of the corresponding perforation 17. If the undercut in the lamp base 18 is of an appropriate configuration, the longitudinal extent of the locking member 24 may also be straight.

The locking member 24' in FIG. 5*b* on the other hand, which extends along a longitudinal axis 30', has a base 28' of substantially circular cross-section, which base 28' is compatible with all the perforations 17 regardless of the shape of their longitudinal sides.

FIG. 6 shows one of the supporting elements 22 to 22' in detail. In the embodiment shown in the drawings, this supporting element is an integral part of the reflector neck 21 or of the supporting shoulder 26, as the case may be, i.e. the supporting elements 22 to 22' are produced in a common die casting operation with the reflector neck 21 and—if the latter is an integral component of the reflector 2—with the reflector 2 as well. On that side of the supporting elements 22 to 22" that faces backwards when seen in the direction in which light emerges (i.e. that is directed in the minus z direction), are formed respective contact-making surfaces 60 for the supported points 50 to 50" on the lamp base 18. The two regions of a supporting element 22 to 22" can be clearly seen: a region 60 that rises obliquely in the direction of rotary movement $\alpha$ and by which the lamp base 18 is raised by approximately 0.3 mm as its slides along during the rotary movement of the light source 3 about the optical axis 10, and a latching depression 60' for the releasable locking of the angle of rotation of the light source 3 at the end of the rotary movement about the optical axis 10. The latching depression preferably takes the form of a latching groove whose longitudinal extent is substantially at right angles to the direction of rotation $\alpha$.

The process of fastening the lamp 3 to the reflector 2 will be explained in detail by reference to FIGS. 7*a* to 7*d*.

From two different perspectives, FIGS. 7*a* and 7*c* show the reflector neck 21 and the first component 20 of the lamp base 18 that is adjacent the reflector, when the first component 20 has been received into the reflector neck 21 and is in the inserted position. The inserted position is the position that the lamp base 18 occupies after its insertion in translation parallel to the optical axis 10. When the lamp base 18 is inserted in translation, the perforations 17 receive the locking members 24, and the coding cut-out 16 receives the coding projection 23. As a result, that end-face 19 of the lamp base 18 that is directed forward rests against the contact-making surfaces of the supporting elements 22 to 22" at its supported points 50 to 50". The noses 29 are arranged in the hollow space 70 in the lamp base 18. The coding projection 23 is arranged against the rear surface of the lamp base 18, which rear surface is opposite from the end-face 19 and is directed towards the igniter 4.

In the course of the rotary movement α that then takes place substantially about the optical axis 10 of the reflector 2, the entire lamp 3 is rotated in a clockwise direction when seen in the direction in which light is emitted. When this is done, the noses 29 of the locking members 24 on the reflector neck 21 fit behind parts of the first component 20 in the regions of the corresponding perforations 17. The coding element 23 fits behind the lamp base 18 as a whole at the same time. The coding element 23 can thus also be said to perform a locking function in the same way as the locking members 24. During at least part of the rotary movement α of the lamp 3 about the optical axis 10 of the reflector 2, the supported points 50 to 50" slide along the rising regions 60 of the supporting elements 22 to 22" until they latch into the latching depressions 60' when the lamp 3 is in its end position. The pressure to latch the supported points 50 to 50" in the latching depressions 60' is exerted on the lamp base 18 by the noses 29, by which the lamp base 18 is pressed against the rear end of the reflector in the axial direction.

It is conceivable not only for a movement in translation in the axial direction to be produced by the co-operation of the locking members 24 and perforations 17 but also, and as well as this, for the light source 3 to be held or releasably located in a defined position in the radial direction relative to the reflector 2. This can for example be done by superimposing on the rotary movement α a further movement, in translation in the radial direction, caused by the co-operation of the locking members 24 and perforations 17. By this means the lamp base 18 is for example pressed against two radially acting supporting points on an inner circumferential surface of tapering form of the reflector neck 21. This can for example be accomplished by causing the longitudinal sides of the perforations 17 to follow a path that curves inwards towards the center in the opposite direction to the direction of rotation α. As a result of this, the lamp base 18 is shifted radially relative to the optical axis 10 in the course of the rotary movement α.

By the locking members 24 that co-operate with the perforations 17, the lamp base 18, and hence the entire lamp 3 is thus fixed in the z direction and, if desired, in the xy plane too, in an exactly defined position in the reflector neck 21 and hence in the reflector 2 as well. In the embodiment shown, the locating action of the locking members 24 and the perforations 17 is assisted by the coding element 23 and the cut-out 16. The fixing of the lamp 3 to the reflector 2 can be performed quickly and easily in this case with only one hand, even when the headlamp is installed in a vehicle.

FIGS. 7*b* and 7*d* show the reflector neck 21, and the lamp base 18, or rather the first component 20, when it has been received therein in the end position. The end position corresponds to the position of the lamp base 18 at the end of the rotary movement α.

FIGS. 8*a* and 8*c* show the reflector neck 21, and the first component 20, i.e. the lamp base 18, when it has been received therein in the inserted position. By a rotary movement of the lamp base 18, and hence of the lamp 3, through the angle α in a clockwise direction, the supported points 50 to 50" on the lamp base 18 are shifted onto the rising contact-making surfaces 60 of the supporting elements 22 to 22", the lamp base 18 being clamped in place by the antagonistic co-operation of the contact-making surfaces 60 and the noses 29 of the locking members 24. In the end position the lamp base 18 latches into the latching depression 60'.

In a way corresponding to what is shown in FIGS. 7*b* and 7*d*, FIGS. 8*b* and 8*d* show the reflector neck 21, and the first component 20, i.e. the lamp base 18, when it has been received therein in the end position.

The invention claimed is:

1. A lighting device for a motor vehicle headlamp, comprising:

a light source for emitting light and a reflector for focusing the light emitted by the light source, there being formed, at the rear end of the reflector, an opening to receive at least a part of the light source, and a reflector neck that surrounds the opening and to which the light source is fastened in a defined position relative to a reflective surface of the reflector, wherein the reflector neck is formed integrally with the reflector, whereby the reflector neck and the reflector are produced in a common die casting operation; and wherein a plurality of locking members are formed on the reflector, which locking members, in the course of a rotary movement of the light source about the optical axis of the reflector or about an axis parallel thereto when the light source has been at least partly inserted in the reflector neck in the direction of the optical axis, engage in corresponding perforations formed in the light source, at least one of the locking members co-operating with at least one of the perforations in the course of the rotary movement in such a way, and causing forced guidance of the light source in such a way, that the light source is held in a defined position relative to the reflector in the axial direction.

2. A lighting device as claimed in claim 1, wherein the perforations and/or cut-outs are formed in that part of the light source that is received by the reflector neck.

3. A lighting device as claimed in claim 1, wherein the part of the light source that is received by the reflector neck is a lamp-base belonging to the light source.

4. A lighting device as claimed in claim 1, wherein the locking members are formed directly on the reflector neck.

5. A lighting device as claimed in claim 1, wherein the locking members that cause the forced guidance of the light source each comprise a nose portion that extends in the circumferential direction in the opposite direction to the rotary movement and that engages in the course of the rotary movement in an undercut associated with a given one of the perforations.

6. A lighting device as claimed in claim 1, wherein the locking members and the corresponding perforations are so positioned and configured that they align the light source in a given radial position relative to the optical axis in the course of the rotary movement.

7. A lighting device as claimed in claim 6, wherein the locking members and the corresponding perforations are so positioned and so configured to correspond to one another that, at least indirectly, they cause that part of the light source that is received by the reflector neck to bear against an inner circumferential surface of the reflector neck.

8. A lighting device as claimed in claim 7, wherein the perforations each follow a path that curves in an arc and is obliquely aligned to the circumferential direction, the distance between the perforations and the center of that part of the light source that is received by the reflector neck decreasing in the direction of the rotary movement.

9. A lighting device for a motor vehicle headlamp, comprising:

a light source for emitting light and a reflector for focusing the light emitted by the light source, there being formed, at the rear end of the reflector, an opening to receive at least a part of the light source, and a reflector neck that surrounds the opening and to which the light source is fastened in a defined position relative to a reflective surface of the reflector, wherein the reflector neck is formed integrally with the reflector;

wherein a plurality of locking members are formed on the reflector, which locking members, in the course of a rotary movement of the light source about the optical axis of the reflector or about an axis parallel thereto when the light source has been at least partly inserted in the reflector neck in the direction of the optical axis, engage in corresponding perforations formed in the light source, at least one of the locking members co-operating with at least one of the perforations in the course of the rotary movement in such a way, and causing forced guidance of the light source in such a way, that the light source is held in a defined position relative to the reflector in the axial direction; and, wherein there are formed on the reflector neck a plurality of axially acting supporting elements that are arranged to be distributed around the opening in the reflector and that each have a contact-making surface that faces towards the rear in the direction of the optical axis of the reflector and on which that part of the light source that is received by the reflector neck is supported when in the fitted state.

10. A lighting device as claimed in claim 9, wherein the contact-making surfaces of the supporting elements follow an inclined path, the inclines of the contact-making surfaces being so aligned that the distance between that part of the light source that is received by the reflector neck at the rear end of the reflector increases during the rotary movement of the light source, over at least part of the angular range covered by the rotary movement, as the angle of rotation increases.

11. A lighting device as claimed in claim 9, wherein there are formed, on that part of the light source that is received by the reflector neck, supported points that project from the surface of the received part and that face towards the contact-making surfaces of the supporting elements of the reflector during at least part of the rotary movement.

12. A lighting device as claimed in claim 11, wherein the contact-making surfaces of the supporting elements of the reflector neck each have a latching depression to receive, towards the end of the rotary movement, an outwardly curved portion of a corresponding supported point on that part of the light source that is received by the reflector neck.

13. A lighting device as claimed in claim 12, wherein the latching depressions take the form of latching grooves whose longitudinal extent lies substantially at right angles to the direction of the rotary movement.

14. A lighting device as claimed in claim 9, wherein the perforations and/or cut-outs are formed in that part of the light source that is received by the reflector neck.

15. A lighting device as claimed in claim 9, wherein the part of the light source that is received by the reflector neck is a lamp-base belonging to the light source.

16. A lighting device as claimed in claim 9, wherein the locking members are formed directly on the reflector neck.

17. A lighting device as claimed in claim 11, wherein the locking members that cause the forced guidance of the light source each comprise a nose portion that extends in the circumferential direction in the opposite direction to the rotary movement and that engages in the course of the rotary movement in an undercut associated with a given one of the perforations.

18. A lighting device as claimed in claim 9, wherein there are formed, on that part of the light source that is received by the reflector neck, supported points that project from the surface of the received part and that face towards the contact-making surfaces of the supporting elements of the reflector during at least part of the rotary movement.

19. A lighting device as claimed in claim 9, wherein the locking members and the corresponding perforations are so positioned and configured that they align the light source in a given radial position relative to the optical axis in the course of the rotary movement.

20. A lighting device as claimed in claim 19, wherein the locking members and the corresponding perforations are so positioned and so configured to correspond to one another that, at least indirectly, they cause that part of the light source that is received by the reflector neck to bear against an inner circumferential surface of the reflector neck.

21. A light source of a lighting device for a vehicle, and in particular a motor vehicle, having a part that can be received by a reflector neck integrally formed with a reflector of the lighting device, whereby the reflector neck and the reflector are produced in a common die casting operation;

wherein the light source has at least one perforation to receive at least one correspondingly formed locking member on the reflector neck, at least one of the perforations being so matched in arrangement and/or configuration to the arrangement and/or configuration of at least one of the locking members that, on being received in the reflector neck, the light source is forcibly guided, during a rotary movement of the said light source that follows about the optical axis of the reflector or about an axis parallel thereto, in such a way that the light source is held in a defined position in the axial direction relative to the reflector.

22. A light source as claimed in claim 21, wherein that part of the light source that is received by the reflector neck is in the form of a lamp base.

23. A light source as claimed in claim 21, wherein at least one of the perforations is of an arcuate form.

24. A light source as claimed in claim 23, wherein the center around which the arc of the at least one arcuate perforation is arranged at a distance from the center of that part of the light source that is received by the reflector neck.

25. A light source as claimed in claim 24, wherein the arc of the at least one arcuate perforation extends obliquely to a circle drawn around the center of that part of the light source that is received by the reflector neck, the distance between the at least one perforation and the center of the received part of the light source decreasing in the direction of rotation.

* * * * *